Sept. 17, 1935.    F. W. BIRTCH    2,014,716
THERMOSTATIC CONTROL
Filed Aug. 17, 1932
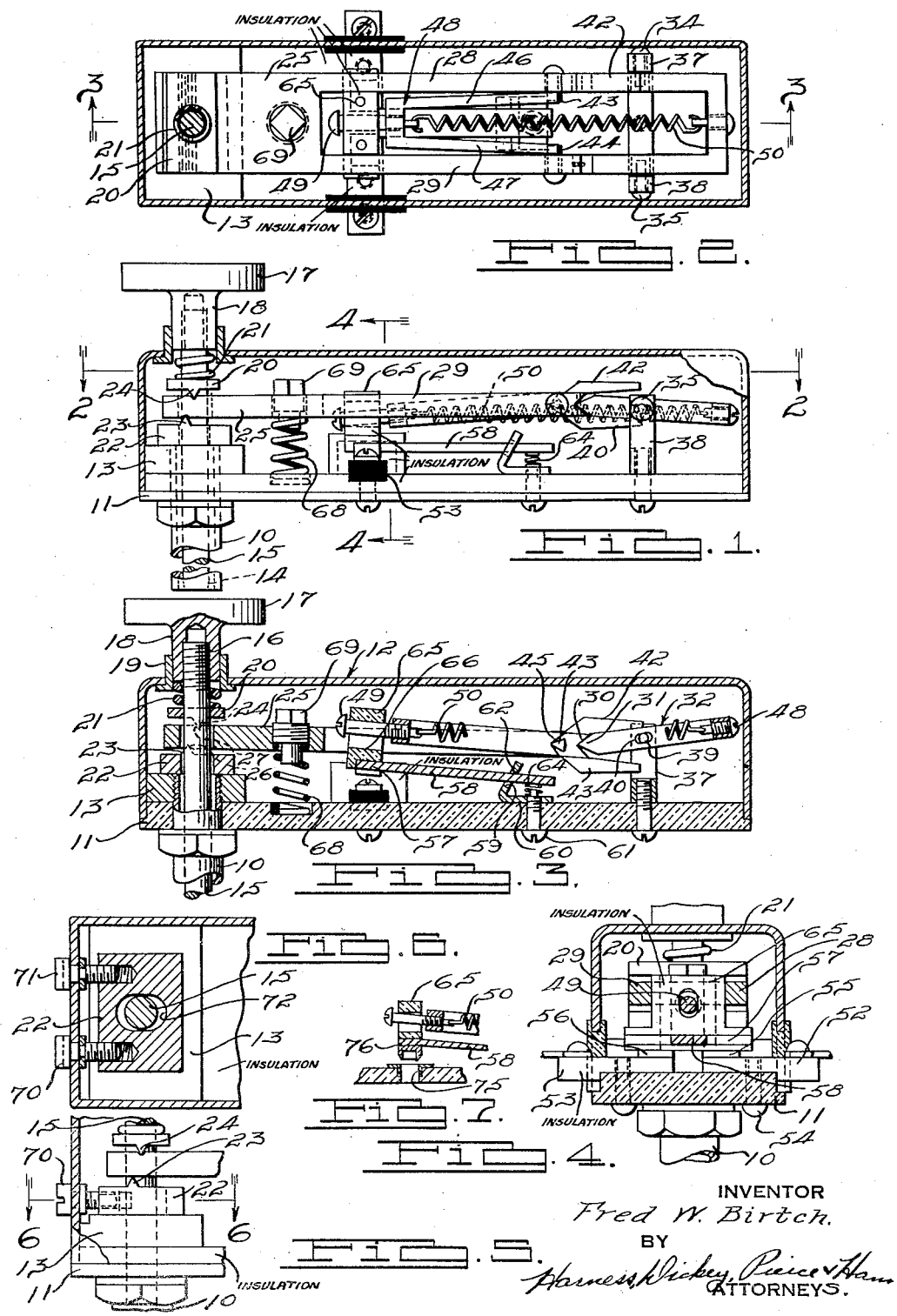
INVENTOR
Fred W. Birtch.
BY
Harness, Dickey, Pierce & Ham
ATTORNEYS.

Patented Sept. 17, 1935

2,014,716

UNITED STATES PATENT OFFICE 2,014,716

THERMOSTATIC CONTROL

Fred W. Birtch, Lexington, Mich., assignor of one-half to Harry A. Shaw

Application August 17, 1932, Serial No. 629,101

11 Claims. (Cl. 200—137)

The invention relates to thermostatically controlled devices and it has particular relation to a thermostatically controlled device for use in conjunction with hot water tanks.

In general, the invention constitutes an improvement over that embodied in my co-pending application for patent, Serial No. 596,708, filed March 4, 1932, and entitled Thermostatically controlled heater.

As stated in such co-pending application for patent, in conjunction with water heaters or the like, it is very desirable that the thermostat operate with minimum or no interference, whether or not it controls an electric switch or a fuel valve, if the thermostat is to constitute an accurate and efficient control for the heater. Also it is important in the switch control, that the switch be closed or opened rapidly and with considerable power to avoid arcing of the electrical current, and to insure operation of the switch at the proper times without drag in operating conditions.

One object of the invention is to provide an improved thermostatically controlled switch, which is opened and closed rapidly and powerfully to avoid arcing of electric current or drag in operating conditions, and wherein the electrical contacts are maintained together under pressure during the time that the switch is suposed to be in a closed condition.

Another object of the invention is to provide a thermostatically controlled switch of the above designated character, wherein such electrical contacts are separated and brought together forcefully and rapidly so as to avoid arcing of the electrical current upon completing or breaking of the electrical circuit.

Another object of the invention is to provide a thermostat control having the above mentioned operating characterisics which may be employed in conjunction with a fuel control valve for controlling the supply of fuel to a burner.

Other objects of the invention will be apparent from the following description, and from the claims hereinafter set forth.

For a better understanding of the invention, reference may be had to the accompanying drawing forming a part of the specification, wherein:

Figure 1 is a side view partly in cross section of a thermostatically controlled electric switch constructed according to one form of the invention.

Figure 2 is a cross-sectional view taken substantially along the line 2—2 of Figure 1;

Figure 3 is a cross-sectional view taken substantially along line 3—3 of Figure 2;

Figure 4 is a cross-sectional view taken substantially along the line 4—4 of Figure 1;

Figure 5 is a fragmentary view of a switch arrangement showing an adjustable fulcrum that may be employed;

Figure 6 is a cross-sectional view taken substantially along the line 6—6 of Figure 5;

Figure 7 is a fragmentary cross-sectional view illustrating one manner in which the thermostatic control may be employed for governing the flow of fuel to a burner.

The thermostatically controlled devices illustrated may be used for example, in conjunction with a water heater such as disclosed in my co-pending application previously identified, although it is manifest that the devices may be employed in other and similar capacities. Referring to Figs. 1, 2 and 3, a tube 10 composed of copper for example, extends through a base 11 of insulating material, of a switch housing 12, and is threaded at its upper and inner end into a block 13 resting on such base. The outer end of the tube 10 is secured, as indicated at 14, to an invar rod 15, which passes upwardly through the tube, the block 13 and through the switch casing 12 and terminates at its upper end in a threaded portion 16. An adjustable disc 17 is threaded on the threaded portion 16 of the rod, and has a tubular portion 18 slidably mounted in a bearing member 19 secured to the upper wall of the housing. From this description it will be apparent that if the tube 10 with the invar rod therein, is placed in water and the water is heated, the copper tube will expand more rapidly than the invar rod, and owing to the connection 14 between the ends of the rod and tube, the rod will be pulled through the casing. Conversely, when the water is cooled, the copper tube will contract more rapidly, and the invar rod will move in the opposite direction.

Inwardly of the disc 17, a block 20 is slidably mounted on the rod 15 and between the block and the end of the tubular portion 18 on the disc, a heavy spring 21 may be provided, which is of such strength that in normal operation of the apparatus, a pull on the invar rod will compress it little, if any. Inwardly of the block 20, a second block 22 seats on the block 13 and the invar rod likewise slidably projects through this block. The spring 21 in one capacity may constitute a safety feature to prevent possible breakage in the event the temperature continues to rise for any reason whatever, and the spring especially seems desirable in the larger types of switches and controls.

The upper surface of block 22 is provided with a V-shaped projection 23 and the lower surface of the block 20 is similarly provided with a V-shaped projection 24, the latter projection being substantially in alignment with the invar rod 15, while the projection 23 is disposed slightly to one side and between this axis and the end of the housing wall adjacent the rod. Between the blocks 20 and 22, the invar rod loosely passes through an arm 25 which has a V-shaped notch 26 adapted to receive the projection 23 and a V-shaped notch 27 adapted to receive the projection 24. It should be understood that the notches are of such angular dimensions that fulcruming movement of the arm 25 will be permitted, although of course, the sharp edges of the projections will seat in the apices of the notches.

The arm 25 extends longitudinally in the housing 12 and as best shown by Fig. 2, has its free end bifurcated to provide legs 28 and 29. Each of these legs, as shown by Figs. 1 and 3, has a notch 30 formed in its end face which is of V-shape, and such notches on both legs receive V-shaped ends 31 of a U-shaped arm 32 disposed between the end of arm 25 and that end of the housing remote with respect to the invar rod connection. The angle defining the V-shaped ends of the arm 32 is smaller than the angle between sides defining the notches 30, so that the arm 32 may fulcrum in such notches between limits defined by the difference between such angles, although it is apparent that the sharp edges of the ends 31 will fulcrum in the apices of the notches.

Screws 34 and 35, threaded through uprights 37 and 38 secured to the base 11, and having inner trunnion portions 39 are provided to guide and position the arm 32, and such trunnion project respectively into elongated openings 40, formed in the legs of arm 32 adjacent the V-shaped ends thereof. The width of these slots closely corresponds to the diameter of the trunnions but the slots are longer than such diameters, to insure proper fulcruming of the arm 32. Also for controlling movement of the arm 32, one or both legs 28 and 29 of the arm 25, may have upper and lower members 42 and 43 secured thereto, and such legs have inner surfaces diverging, to permit but limit fulcruming movement of the arm.

Adjacent the notches 30 in the ends of the legs 28 and 29 of arm 25, such legs are provided with inwardly directed projections 43 and 44 which in this instance constitute inner end portions of screws threaded laterally through the legs. These projections are V-shaped as shown best in Fig. 3, with the apex of the V directed away from the notches 30, and extend into notches 45 formed in the end faces of legs 46 and 47 of a second U-shaped arm 48 disposed between the legs 28 and 29 of the arm 25. The notches 45 have side walls directed at an angle to each other which is greater than the angle of the V-shaped projections 43 and 44 so that the member 48 may fulcrum within limits. The base portion of the U members 32 and 48, respectively, have screw connections 48 and 49 to which opposite ends of a spring 50 are connected. This spring is of extremely strong character and it will be evident in view of the provision of elongated slots 40 for receiving the trunnion 39, that the spring will maintain the member 32 seated in the notches 30 without interference as a result of the trunnions engaging the ends of the openings 40, and that the member 48 likewise will be maintained strongly fulcrumed on the projections 43 and 44. Accordingly, the spring exerts its force through the arms 32 and 48 against the bases of the notches 30 in arm 25 and against the projections 43 and 44, and with no effect on moving the arm 25 longitudinally of the housing.

As shown best by Figure 4, electrical terminals 52 and 53, are secured at opposite sides of the base 11, by means of screws 54 and these terminals inwardly of the housing are spaced. Contact elements 55 and 56 are provided on the upper surfaces of the terminals adjacent the inner ends thereof and such contact elements are adapted to be bridged to complete an electrical circuit through the terminals 52 and 53, by means of an elongated contact element 57. This contact element as best shown by Fig. 3, has a leg 58 extending longitudinally of the housing and through a slot 59 formed in a bracket 60 secured to the base 11 by means of a screw 61. The slot 59 in the bracket 60 is sufficiently large that the leg 58 carrying the contact 57, may fulcrum about the upper side of the slot and preferably that portion of the bracket provided with the slot, is inclined to provide a corner fulcrum indicated at 62. Between the bracket and the free end of the leg 58, and encircling a reduced portion of the screw 61, a helical spring 64 is provided, which is normally under compression. It is apparent that this spring acting upwardly against the free end of the leg 58, normally urges the contact element 57 about its fulcrum into bridging relation with the contacts 55 and 56. The contact element 57 is secured to a block 65 composed of insulating material, having a slot 66 therein through which the screw 49 extends and this slot is considerably deeper than the diameter of the screw to permit vertical movement of the screw in the slot.

As shown by Fig. 3 particularly, a relatively strong spring 58 is disposed between the lower side of arm 25 and the lower housing wall and in such position that it urges the arm upwardly. An adjusting screw 69 threaded through the arm and having a trunnion portion entering one end of the spring, may be used for adjusting the tension on the spring.

In operation of the control, attention is first directed to Fig. 1 which shows the U-shape arms 32 and 48 in their lower positions in which positions, the screw 49 on arm 48 engages the lower side of the slot 66 in the block 65, and firmly holds the contact 57 in engagement with the contacts 55 and 56, thus completing the electrical circuit and the arm 32 engages the lower leg 43 secured to the free end of arm 25. It is apparent that the spring 50 is below its dead center position and accordingly that it is very effective, in addition to spring 64, for holding the contacts together to complete the electrical circuit.

Now assuming that the copper tube 10 is disposed in water and the water is being heated by a coil energized by completion of the electrical circuit between the terminals 52 and 53, as the water becomes warmer, the copper tube 10 elongates thus pulling the invar rod 15 downwardly. As such invar rod moves downwardly, the block 20 is moved downwardly and such movement of the block will cause the arm 25 to fulcrum about the projection 23 on block 22 and hence the free end of the arm to move toward the lower housing wall, against the action of the spring 68. As the free end of arm 25 moves downwardly, the arm 32 will fulcrum about the trunnions 39, although slight longitudinal movement of the arm may occur as a result of its arcuate movement. As the arm 32 so fulcrums, it is apparent that the end of the spring 50 connected thereto, will be moved upwardly and when this movement is sufficient to substantially align the spring with the projections 43 and 44, the spring moving past dead center or neutral position, will cause both arms 32 and 48 to move rapidly and forcefully to their upper positions. With the screw 49, however, in engagement with the lower wall of the slot 66 when the arm 48 is in its lowermost position, it is apparent that the free end of the arm must move upwardly the depth of the slot before it will cause any movement upwardly of the block 65 carrying the contact 57. If the block 65 were directly and positively connected to the arm 48, without permissibility of relative movement vertically, as soon as the spring 50 approximately reaches its dead center position, there may be a tendency for temporary floating of the arm until the spring passed dead center and became effective to move the arm upwardly. While any floating of the arm when the spring is near and in its dead center position is only instantaneous, and probably not visible, it is apt to be sufficient to separate the contact 57 slightly from the contacts 55 and 56, and cause arcing of the electrical current and possibly such increase in temperature at the ends of the arc to actually weld the contacts together. Provision of the slot 66 negatives any floating of the arm 48 from effecting the block 65 and hence the contact 57. It is also apparent that as the arm 48 moves upwardly, passing its dead center position, the screw 49 will not engage the upper side of the slot 66 in block 65 to move the latter upwardly, until the spring 50 has moved substantially past dead center and is forcefully effective to throw the block upwardly at a rapid and forceful rate. In other words the spring 50 substantially passes its dead center position before it becomes effective through the arm 48 and screw 49 to move the block 65 upwardly.

Along this line it is also apparent that as the spring 50 approaches dead center position, pressure of the screw 49 downwardly on the lower face of the block 66 becomes less and less effective and finally becomes zero effective until the spring moves the screw in the other direction when the spring becomes effective for moving the block in the other direction. During this time, however, the spring 64 is effective for holding the contacts together under pressure and it is apparent that this spring will hold the contacts together under such pressure until the screw 49 is thrown against the upper side of the slot 56 and this occurs when the spring 50 has become so effective that a rapid and forceful movement of the block 65 carrying the contact 57 upwardly is effected. What really happens is that as the spring 50 approaches and passes dead center position, the spring 64 holds the contacts together under pressure until the screw 49 is thrown upward and strikes the upper side of the slot 66 in block 55, to carry the block on upwardly quickly and forcefully. Movement of the arm 48 and block upwardly is limited by engagement of laterally projecting portions of the contact 57 and block, with under sides of the legs 28 and 29 of arm 25.

When the block 65 is thrown upwardly, it is apparent that the electrical circuit is interrupted and hence that the water heating unit will be deenergized. As the water and hence the copper tube 10 cool, the latter contracts and the invar rod 15 moves upwardly. The spring 68 then tends to move the arm 25 in a reverse direction until finally the spring 50 again passes dead center position in the reverse direction, at which time the screw 49 will be thrown down against the lower face of the slot 66 and the spring will be forcefully effective to throw the contacts together, to also avoid any arcing of electrical current.

Adjustment of the disc 17 permits a variation in the high and low temperature of any given range. To vary the range, as shown in Figs. 5 and 6, screws 70 and 71 may be non-slidably but rotatably journaled in the end wall of the casing and threaded into the block 22 which may have an elongated opening 72 for accommodating the invar rod 15. In this case, it may be preferred not to use any notch 26 in the arm 25 for accommodating the V-shaped projection 23 on the block. Adjustment of the screws 70 and 71 may be effective to move the block 22 inwardly or outwardly thus disposing the projection 23 nearer to or farther from the projection. If the projections 23 and 24 are nearer together it is apparent that a smaller movement of the invar rod will cause the arm 25 to move between its limited positions, whereas if the projections are farther apart a greater movement of the invar rod will be necessary to accomplish this and since the movement of the invar rod depends upon the temperature change, in this manner the range of temperature control may be varied. In many circumstances, the adjustment shown by Fig. 6 may not be necessary if the range is of a standard character.

Fig. 7 illustrates the base of the housing provided with a fuel conducting opening 75 and the block 65 provided with a valve 76. In other words instead of using electrical contacts for controlling an electrical circuit, a valve and valve seat may be employed in place of the contacts for controlling the flow of fuel to a burner.

Temperature control devices such as illustrated and described, more positively prevent arcing of electrical current between the contacts for several reasons. In the first place, the spring 50 comes into action to make and break the circuit or to close and open a valve as the case may be, only after the spring has substantially passed dead center position and immediately adjacent to and on either side of dead center position, the spring only effects a movement of the arm 48 in the slot 66 without effecting breaking or making of the circuit or closing or opening of the valve. Accordingly, the spring is effective more rapidly to make and break the electrical circuit or to open and close the valve. Employment of the smaller spring 64 insures maintenance of the contacts together under pressure until such time as the screw 49 on arm 48 forcefully hits the upper side of the slot 66 and block 65 to carry the block and contact 67 upwardly rapidly and powerfully. Thus, floating of the contact 57 adjacent to the lower pair of contacts 55 and 56 is avoided and any possible arcing of electrical current is prevented.

Although more than one form of the invention has been illustrated and described, it will be apparent to those skilled in the art, that various modifications may be made without departing from the scope of the appended claims.

What is claimed is:

1. An electrical control comprising a support, an elongated member fulcrumed on the support, means for moving the member about its fulcrum, a pair of arms disposed generally in end-to-end relation adjacent ends of the arms on the member, a tensioned spring connecting the remote ends of the arms, means fulcruming one arm intermediate its ends on the support, a pair of electric contacts on the support adjacent the free end of the other arm, movable conductor means for bridging the contacts, means connecting the free end of said last mentioned arm to said movable conductor means for allowing movement of the spring and arm substantially past a dead center position prior to effecting movement of the conductor means, and spring means normally applying light pressure to said conductor means to hold the latter in engagement with the contacts until such movement of the latter arm occurs.

2. An electrical control comprising a support, an elongated member fulcrumed on the support, means for moving the member about its fulcrum, opposed arms having adjacent ends fulcrumed on the outer end of the member, a tensioned spring connecting opposed ends of the arms, and means on the member and engageable with one of the arms at points substantially spaced from the fulcrum, for the latter for limiting fulcruming movement of the arm.

3. An electrical control comprising a support, an elongated member fulcrumed on the support, means for moving the member about its fulcrum, opposed arms having adjacent ends fulcrumed on the outer end of the member, a tensioned spring connecting opposed ends of the arms, means for fulcruming one arm intermediate its ends on the support, and means on the member and engageable with the last mentioned arm at points substantially spaced from the fulcrum for the latter, for limiting fulcruming movement of the arm.

4. An electrical control comprising a support, an elongated member fulcrumed on the support, means for moving the member about its fulcrum, a pair of arms fulcrumed on the outer end of the member and extending in opposite directions from the fulcrum, a tensioned spring connecting free ends of the arms, means fulcruming one arm intermediate its ends on the support, a pair of electric contacts on the support, and means movable by the free end of the other arm for bridging the contacts when the arm is in one position.

5. An electrical control comprising a support, an elongated member fulcrumed on the support, means for moving the member about its fulcrum, a pair of arms fulcrumed on the outer end of the member and extending in opposite directions from the fulcrum, a tensioned spring connecting free ends of the arms, means fulcruming one arm intermediate its ends on the support, a pair of electric contacts on the support, means movable by the free end of the arm for bridging the contacts when the arm is in one position, and means allowing limited movement of the arm without moving said means.

6. An electrical control comprising a support, an elongated member fulcrumed on the support, means for moving the member about its fulcrum, a pair of arms fulcrumed on the outer end of the member and extending in opposite directions from the fulcrum, a tensioned spring connecting free ends of the arms, means fulcruming one arm intermediate its ends on the support, a pair of electric contacts on the support, and means movable by the free end of the other arm and insulated therefrom for bridging the contacts when the arm is in one position.

7. An electrical control comprising a support, a pair of arms disposed in toggle relation, means movable transversely of the arms pivotally supporting adjacent ends of the arms, a tensioned spring connecting remote ends of the arms, means fulcruming one arm on the support at a point intermediate the ends of the arm, a pair of electric contacts on the support adjacent the outer end of the other arm, means movable by the outer end of the last mentioned arm for bridging the contacts, and control means for moving the first mentioned means.

8. An electrical control comprising a support, an elongated member fulcrumed on the support, means for moving the member about its fulcrum, a pair of arms fulcrumed on the outer end of the member and extending in opposite directions from the fulcrum, a tensioned spring connecting free ends of the arms, means for fulcruming one arm intermediate its ends on the support, a pair of electrical contacts on the support, and means loosely connected to the free end of the other arm for bridging the contacts when the latter arm is in one position.

9. An electrical control comprising a support, an elongated member fulcrumed on the support, means for moving the member about its fulcrum, a pair of arms fulcrumed on the outer end of the member and extending in opposite directions from the fulcrum, a tensioned spring connecting free ends of the arms, means for fulcruming one arm intermediate its ends on the support, a pair of electrical contacts on the support, an insulating member operatively mounted on the free end of the other arm, and means connected to said insulating member for bridging the contacts when the arm is in one position.

10. An electrical control comprising a support, an elongated member fulcrumed on the support, means for moving the member about its fulcrum, a pair of arms fulcrumed on the outer end of the member and extending in opposite directions from the fulcrum, a tensioned spring connecting free ends of the arms, means for fulcruming one arm intermediate its ends on the support, a pair of electric contacts on the support, movable means for bridging the contacts, and means connecting the other arm to said movable means for moving the latter with the arm but allowing an initial movement of the arm before said movable means is moved thereby.

11. An electrical control comprising a support, an elongated member fulcrumed on the support, means for moving the member about its fulcrum, a pair of arms fulcrumed on the outer end of the member and extending in opposite directions from the fulcrum, a tensioned spring connecting free ends of the arms, means for fulcruming one arm intermediate its ends on the support, a pair of electric contacts on the support, movable means for bridging the contacts, and means operatively connecting the other arm to said movable means for movement together, said connecting means being of such character that the arm moves substantially past its dead center position before it moves the movable means.

FRED W. BIRTCH.